United States Patent
Nagase et al.

(10) Patent No.: US 8,861,076 B2
(45) Date of Patent: Oct. 14, 2014

(54) POLARIZING PLATE HAVING POLARIZER AND ULTRAVIOLET SHIELDING LAYER CONTAINING INORGANIC FINE PARTICLES AND IMAGE DISPLAY APPARATUS COMPRISING THE SAME

(75) Inventors: Junichi Nagase, Osaka (JP); Bin Fang, Osaka (JP); Seiji Umemoto, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 426 days.

(21) Appl. No.: 12/907,131

(22) Filed: Oct. 19, 2010

(65) Prior Publication Data
US 2011/0109847 A1 May 12, 2011

(30) Foreign Application Priority Data
Nov. 10, 2009 (JP) ................................. 2009-256762

(51) Int. Cl.
| G02B 5/30 | (2006.01) |
| G02B 27/28 | (2006.01) |
| G02B 5/22 | (2006.01) |
| C08L 33/14 | (2006.01) |
| G02B 5/20 | (2006.01) |

(52) U.S. Cl.
CPC ................ *G02B 5/3033* (2013.01); *G02B 5/22* (2013.01); *C08L 33/14* (2013.01); *G02B 5/208* (2013.01)
USPC .......................................... 359/352; 359/361

(58) Field of Classification Search
USPC ........................ 359/350–361, 483.01–494.01; 428/1.1–1.62
See application file for complete search history.

(56) References Cited

U.S. PATENT DOCUMENTS

| 5,827,507 | A | 10/1998 | Oshima et al. | |
| 5,914,073 | A * | 6/1999 | Kobayashi et al. | ........... 252/585 |
| 6,210,858 | B1 | 4/2001 | Yasuda et al. | |
| 6,950,236 | B2 | 9/2005 | Hokazono et al. | |
| 6,974,608 | B2 | 12/2005 | Shimizu et al. | |
| 7,592,055 | B2 * | 9/2009 | Takeda et al. | ................. 428/35.1 |
| 7,630,134 | B2 * | 12/2009 | Takahashi et al. | ....... 359/485.01 |
| 7,704,570 | B2 | 4/2010 | Takebe et al. | |
| 7,824,740 | B2 * | 11/2010 | Kawanishi | .................... 427/508 |
| 7,864,425 | B2 | 1/2011 | Okada et al. | |
| 8,182,102 | B2 | 5/2012 | Asakura et al. | |
| 8,208,197 | B2 | 6/2012 | Asakura et al. | |
| 2004/0114248 | A1 | 6/2004 | Hokazono et al. | |
| 2007/0048459 | A1 | 3/2007 | Takebe et al. | |

(Continued)

FOREIGN PATENT DOCUMENTS

| CN | 1502048 A | 6/2004 |
| CN | 101253429 A | 8/2008 |

(Continued)

OTHER PUBLICATIONS

U.S. Office Action dated Mar. 5, 2013, issued in U.S. Appl. No. 13/074,793.

(Continued)

*Primary Examiner* — Derek S Chapel
*Assistant Examiner* — Tamara Y Washington
(74) *Attorney, Agent, or Firm* — Westerman, Hattori, Daniels & Adrian, LLP

(57) ABSTRACT

A polarizing plate including a polarizer, a UV-shielding layer containing an inorganic fine particle with a bandgap of 3.0 eV or more and a binder resin, and a protective film.

10 Claims, 2 Drawing Sheets

(56) References Cited

U.S. PATENT DOCUMENTS

| | | |
|---|---|---|
| 2008/0186576 A1* | 8/2008 | Takada .................. 359/492 |
| 2008/0198446 A1 | 8/2008 | Asakura et al. |
| 2009/0128912 A1 | 5/2009 | Okada et al. |
| 2009/0244703 A1 | 10/2009 | Asakura et al. |

FOREIGN PATENT DOCUMENTS

| | | |
|---|---|---|
| CN | 101545991 A | 9/2009 |
| JP | 4-110380 A | 4/1992 |
| JP | 7-333423 A | 12/1995 |
| JP | 8-12961 A | 1/1996 |
| JP | 2002-341135 A | 11/2002 |
| JP | 2003-138033 A | 5/2003 |
| JP | 2003-183414 A | 7/2003 |
| JP | 2005-246776 A | 9/2005 |
| JP | 2007-003788 A | 1/2007 |
| JP | 2008-233882 A | 10/2008 |
| JP | 2009-31720 A | 2/2009 |
| JP | 2009-104076 A | 5/2009 |
| WO | 2007/032217 A1 | 3/2007 |

OTHER PUBLICATIONS

Chinese Office Action dated Oct. 31, 2012 issued in Chinese Patent Application No. 201110096766.0, (16 pages). With English Translation.

Japanese Office Action dated May 7, 2013, issued in corresponding Japanese Patent Application No. 2009-256762, w/ English translation.

U.S. Office Action dated Oct. 1, 2013, issued in U.S. Appl. No. 13/074,793.

Japanese Office Action dated Oct. 16, 2013, issued in Japanese Patent Application No. 2010-092821, w/English translation (5 pages).

Japanese Office Action dated Jul. 31, 2013, issued in corresponding Japanese Patent Application No. 2010-092821, w/English translation.

U.S. Non-Final Office Action dated Feb. 21, 2014 issued in related U.S. Appl. No. 13/074,793 (15 pages).

Notice of Allowance dated Jun. 10, 2014, issued in related U.S. Appl. No. 13/074,793 (21 pages).

* cited by examiner

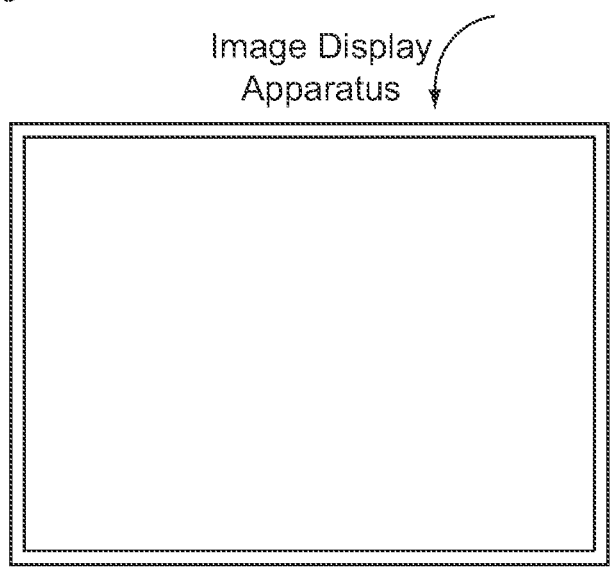

POLARIZING PLATE HAVING POLARIZER AND ULTRAVIOLET SHIELDING LAYER CONTAINING INORGANIC FINE PARTICLES AND IMAGE DISPLAY APPARATUS COMPRISING THE SAME

BACKGROUND OF THE INVENTION

1. Field of the Invention

The present invention relates to a polarizing plate. More specifically, the present invention relates to a polarizing plate having UV-shielding ability.

2. Description of the Related Art

In a liquid crystal display apparatus that is a typical image display apparatus, it is known that polarizing plates are placed on both sides of a liquid crystal cell due to its image forming system. The polarizing plate is generally formed by attaching protective films to both surfaces of a polarizer with an adhesive. As the protective film, typically, a cellulose-based resin film is used.

The polarizer and liquid crystal molecules of the liquid crystal cell are degraded due to UV-light from sunlight or a backlight. In order to prevent the degradation, a cellulose-based resin film containing an organic UV-absorbing agent has been proposed (for example, Japanese Patent Application Laid-open No. 2007-3788). However, such a film has a problem that a UV-absorbing agent bleeds out due to heating at high temperature or variation with time, and the adhesiveness between layers decreases, which makes it impossible to maintain display quality. Further, the organic UV-absorbing agent has a problem that sufficient UV-shielding ability is unlikely to be obtained, and the transparency decreases if the content of the organic UV-absorbing agent is increased.

SUMMARY OF THE INVENTION

The present invention has been made in view of solving the above-described conventional problems, and a main object of the present invention is to provide a polarizing plate having sufficient UV-shielding ability and being capable of maintaining excellent display quality.

According to one aspect of the present invention, a polarizing plate is provided. The polarizing plate includes a polarizer, a UV-shielding layer containing an inorganic fine particle with a bandgap of 3.0 eV or more and a binder resin, and a protective film.

In one preferred embodiment of the present invention, the inorganic fine particle is at least one kind of an inorganic fine particle selected from the group consisting of zinc oxide, zinc sulfide, cerium oxide, titanium oxide, and gallium nitride.

In another preferred embodiment of the present invention, excitation of an electron of the inorganic fine particle is direct transition.

In still another preferred embodiment of the present invention, the protective film has a moisture permeability of 200 g/m² or less.

In still another preferred embodiment of the present invention, a resin forming the protective film is formed of (meth) acrylic resin.

In still another preferred embodiment of the present invention, the inorganic fine particle has an average primary particle diameter of 1 to 400 nm.

In still another preferred embodiment of the present invention, a difference Δn between a refractive index of the inorganic fine particle and a refractive index of the binder resin is 1.0 or less.

In still another preferred embodiment of the present invention, the binder resin is polyurethane-based resin.

In still another preferred embodiment of the present invention, a content of the inorganic fine particle is 5 to 200 parts by weight based on 100 parts by weight of the binder resin in terms of a solid content.

In still another preferred embodiment of the present invention, the UV-shielding layer has a thickness of 0.5 to 10 μm.

In still another preferred embodiment of the present invention, a transmittance of a laminate of the protective film and the UV-shielding layer in a visible region (550 nm) is 80% or more, and a transmittance thereof in a UV-region (350 nm) is 5% or less.

According to another aspect of the present invention, an image display apparatus is provided. The image display apparatus includes the polarizing plate.

According to the present invention, a polarizing plate which has sufficient UV-shielding ability and is capable of suppressing adverse phenomena, such as bleedout, to ensure excellent display quality can be provided by providing a UV-shielding layer containing inorganic fine particles.

BRIEF DESCRIPTION OF THE DRAWING

FIG. 2 is a schematic view illustrating an example of an image display apparatus comprising the polarizing plate of the current invention.

DETAILED DESCRIPTION OF THE PREFERRED EMBODIMENTS

Figure 1:
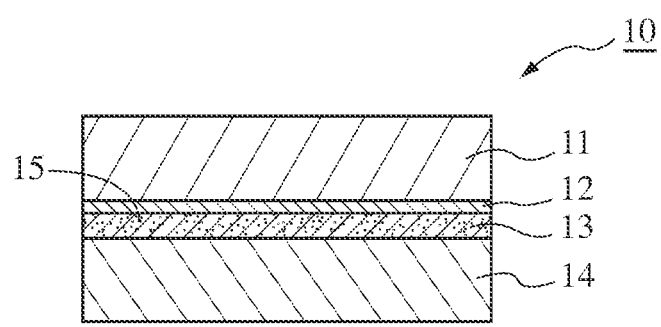
FIG. 1 is a schematic cross-sectional view illustrating a polarizing plate according to a preferred embodiment of the present invention.

Hereinafter, description is made of preferred embodiments of the present invention, but the present invention is not limited to these embodiments.

A. Entire Configuration of Polarizing Plate

FIG. 1 is a schematic cross-sectional view of a polarizing plate according to a preferred embodiment of the present invention. A polarizing plate 10 has a polarizer 11, an adhesive layer 12, a UV-shielding layer 13, and a protective film 14. In this embodiment, the UV-shielding layer 13 is placed between the polarizer 11 and the protective film 14. The UV-shielding layer 13 contains inorganic fine particles 15 and a binder resin. Although not shown, practically, the polarizing plate 10 further has a second protective film laminated via an adhesive layer on an opposite side of the polarizer 11 with respect to the protective film 14.

A-1. Polarizer

Any suitable polarizer may be adopted as the above-mentioned polarizer. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferable because of high polarized dichromaticity. A thickness of the polarizer is preferably 0.5 to 80 μm.

The polarizer prepared by adsorbing iodine on a polyvinyl alcohol-based film and uniaxially stretching the film is produced typically by soaking a polyvinyl alcohol-based film in an iodine aqueous solution to dye the film and stretching the resultant film by 3 to 7 times the original length. The film may be stretched after dyeing or during dyeing, or the film may be dyed after stretching. The polarizer is produced by subjecting the film to, for example, swelling, cross-linking, adjustment, washing with water, drying, etc. in addition to stretching and dyeing.

A-2. UV-shielding Layer

The UV-shielding layer contains inorganic fine particles and a binder resin. The band gap of the inorganic fine particles is preferably 3.0 eV or more. Specifically, as the inorganic fine particles, at least one kind selected from the group consisting of zinc oxide, zinc sulfide, cerium oxide, titanium oxide, and gallium nitride is used. Further, the inorganic fine particles in which the excitation of electrons is direct transition are preferably used due to the excellent UV-absorbing efficiency thereof. Examples of the direct transition type inorganic fine particles include zinc oxide, zinc sulfide, and gallium nitride. Zinc oxide and titanium oxide are used preferably, and zinc oxide is most preferably used, since the absorption end wavelength thereof is in a UV-region of 400 nm or less and they have excellent UV-absorbing efficiency. The inorganic fine particles have better UV-absorbing efficiency, compared with that of an organic UV-absorbing agent, and hence, the compounding amount can be reduced. Consequently, the film thickness can be reduced, and the influence on the polarizing plate can be suppressed. Further, sufficient UV-shielding ability can be provided while ensuring transparency by providing such a UV-shielding layer.

The average primary particle diameter of the inorganic fine particles is preferably 1 to 400 nm, more preferably 1 to 100 nm. Inorganic fine particles with such a particle diameter provide excellent transparency and can suppress the influence on the optical characteristics of the polarizing plate. Further, when the average primary particle diameter is smaller than a visible light wavelength, the smaller the average primary particle diameter is, the more the light scattering by the particles can be suppressed. Therefore, the influence on the optical characteristics of the polarizing plate can be suppressed more as the average primary particle diameter becomes smaller.

The difference $\Delta n$ between the refractive index of the inorganic fine particles and the refractive index of the binder resin is preferably 1.0 or less, more preferably 0.5 or less. By setting $\Delta n$ at 1.0 or less, the transparency increases and the influence on the optical characteristics of the polarizing plate is suppressed. The refractive index of the inorganic fine particles is preferably 3.0 or less, more preferably 2.5 or less. By such inorganic fine particles, the above-mentioned $\Delta n$ can be satisfied.

As the binder resin, any suitable resin is used. Preferably, a resin having both an adhesive property and flexibility, and being capable of dispersing the inorganic fine particles easily is used. For example, a rein compatible with a solvent which disperses the inorganic fine particles is used preferably. The refractive index of the binder resin is typically 1.45 to 1.65, preferably 1.5 to 1.6.

Specific examples of the binder resin include (meth)acrylic resin, polyurethane-based resin, polyester-based resin, phenol resin, polyvinyl alcohol resin, ethylene-vinyl acetate resin, epoxy resin, silicon resin, and cyanoacryl resin. Of those, polyurethane-based resin having both an excellent adhesive property and flexibility is preferred. Consequently, a UV-shielding layer excellent in adhesiveness with an optical member such as a protective film and a polarizer can be obtained.

The polyurethane-based resin refers to a resin having a urethane bond, and also includes an acryl-polyurethane copolymer and a polyester-polyurethane copolymer. The polyurethane-based resin is typically obtained by reacting polyol with polyisocyanate. There is no particular limit to polyol as long as it has at least two hydroxyl groups in molecules, and any suitable polyol is used. Examples thereof include polyacrylic polyol, polyester polyol, and polyether polyol. Those polyols are used alone or in combination.

The polyacrylic polyol is typically obtained by copolymerizing a (meth)acrylic acid ester and a monomer having a hydroxyl group. Examples of the (meth)acrylic acid esters include methyl (meth)acrylate, butyl (meth)acrylate, 2-ethylhexyl (meth)acrylate, and cyclohexyl (meth)acrylate. Examples of the monomer having a hydroxyl group include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 2-hydroxypentyl(meth)acrylate; (meth)acrylic acid monoesters of polyalcohols such as glycerine and trimethylolpropane; and N-methylol (meth)acrylamide. They may be used alone or in combination.

In addition to the above-mentioned monomer components, other monomers may be copolymerized to the polyacrylic polyol. Any suitable monomer may be adopted as the above-mentioned other monomers as long as they are copolymerizable. Specific examples include unsaturated monocarboxylic acids such as (meth)acrylic acid; unsaturated dicarboxylic acids such as maleic acid, and anhydrides and mono- or di-esters thereof; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methyl vinyl ether; α-olefins such as ethylene and propylene; halogenated α,β-unsaturated aliphatic monomers such as vinyl chloride and vinylidene chloride; and α,β-unsaturated aromatic monomers such as styrene and α-methylstyrene. They may be used alone or in combination.

The polyester polyol is typically obtained by reacting a polybasic acid component with a polyol component. Examples of the polybasic acid component include aromatic dicarboxylic acids such as orthophthalic acid, isophthalic acid, telephthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid; aliphatic dicarboxylic acids such as oxalic acid, succinic acid, malonic acid, glutaric acid, adipic acid, pimelic acid, suberic acid, azelaic acid, sebacic acid, decane dicarboxylic acid, dodecane dicarboxylic acid, octadecane dicarboxylic acid, tartaric acid, alkyl succinic acid, linoleic acid, maleic acid, fumaric acid, mesaconic acid, citraconic acid, and itaconic acid; alicyclic dicarboxylic acids such as hexahydrophthalic acid, tetrahydrophthalic acid, 1,3-cyclohexane dicarboxylic acid, and 1,4-cyclohexane dicarboxylic acid; or reactive derivatives such as acid anhydrides, alkyl esters, or acid halides thereof. They may be used alone or in combination.

Examples of the polyol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 1-methyl-1,3-butylene glycol, 2-methyl-1,3-butylene glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4- dimethylbutylene glycol, diethylene glycol, triethylene glycol, polyethylene glycol, dipropylene glycol, polypropylene glycol, 1,4-cyclohexane dimethanol, 1,4-cyclohexanediol, bisphenol A, bisphenol F, hydrogenated bisphenol A, and hydrogenated bisphenol F. They may be used alone or in combination.

The polyether polyol is typically obtained by ring-opening addition polymerization in an alkylene oxide to a polyalcohol. Examples of the polyalcohol include ethylene glycol, diethylene glycol, propylene glycol, dipropylene glycol, glycerine, and trimethylolpropane. Examples of the alkylene oxide include ethylene oxide, propylene oxide, butylene oxide, styrene oxide, and tetrahydrofuran. They may be used alone or in combination.

Examples of the polyisocyanate include aliphatic diisocyanates such as tetramethylenediisocyanate, dodecamethylene diisocyanate, 1,4-butane diisocyanate, hexamethylene diisocyanate, 2,2,4-trimethylhexamethylene diisocyanate, 2,4,4-trimethylhexamethylene diisocyanate, lysine diisocyanate, 2-methylepentane-1,5-diisocyanate, and 3-methylepentane-1,5-diisocyanate; alicyclic diisocyanates such as isophorone diisocyanate, hydrogenated xylylene diisocyanate, 4,4'-cyclohexylmethanediisocyanate, 1,4-cyclohexanediisocyanate, methylcyclohexylene diisocyanate, and 1,3-bis(isocyanatomethyl)cyclohexane; aromatic diisocyanates such as tolylene diisocyanate, 2,2'-diphenylmethane diisocyanate, 2,4'-diphenylmethane diisocyanate, 4,4'-diphenylmethane diisocyanate, 4,4'-diphenyldimethylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate; and aromatic aliphatic diisocyanates such as dialkyldiphenylmethane diisocyanate, tetraalkyldiphenylmethane diisocyanate, and $\alpha,\alpha,\alpha,\alpha$-tetramethylxylylene diisocyanate. They may be used alone or in combination.

The polyurethane-based resin preferably has a carboxyl group. Due to the presence of the carboxyl group, a UV-shielding layer excellent in adhesiveness to an optical member may be provided. The polyurethane-based resin having a carboxyl group may be obtained, for example, by reacting a chain extender having a free carboxyl group in addition to the polyol and the polyisocyanate. Examples of the chain extender having a free carboxyl group include dihydroxycarboxylic acids and dihydroxysuccinic acid. Examples of the dihydroxycarboxylic acids include dialkylolalkanoic acids such as a dimethylolalkanoic acid (e.g., dimethylolacetic acid, dimethylolbutanoic acid, dimethylolpropionic acid, dimethylolbutyric acid, or dimethylolpentanoic acid). They may be used alone or in combination.

In the production of the polyurethane-based resin, in addition to the above-mentioned components, other polyols and other chain extenders may be reacted. Examples of the other polyols include polyols having 3 or more hydroxyl group such as sorbitol, 1,2,3,6-hexanetetraol, 1,4-sorbitan, 1,2,4-butanetriol, 1,2,5-pentanetriol, glycerine, trimethylolethane, trimethylolpropane, and pentaerithritol. Examples of the other chain extenders include glycols such as ethylene glycol, diethylene glycol, triethylene glycol, 1,3-propanediol, 1,3-butanediol, 1,4-butanediol, neopentyl glycol, pentanediol, 1,6-hexanediol, and propylene glycol; aliphatic diamines such as ethylene diamine, propylene diamine, hexamethylene diamine, 1,4-butane diamine, and aminoethylethanol amine; alicyclic diamines such as isophorone diamine and 4,4'-dicyclohexylmethane diamine; and aromatic diamines such as xylylene diamine and tolylene diamine.

As a method of producing the polyurethane-based resin, any suitable method may be adopted. Specific examples thereof include a one-shot method of reacting each of the above-mentioned components at a time and a multistage method of reacting the components in stages. In the case where the polyurethane-based resin has a carboxyl group, the multistage method is preferably used. This is because the carboxyl group may be introduced easily. Note that, in the production of the polyurethane-based resin, any suitable urethane reaction catalyst may be used.

At the time of the production of the polyurethane-based resin, a neutralizer is preferably used. Improvement in stability of the polyurethane-based resin in water is obtainable by using a neutralizer. Examples of the neutralizer include ammonia, N-methylmorpholine, triethylamine, dimethylethanolamine, methyldiethanolamine, triethanolamine, morpholine, tripropylamine, ethanolamine, triisopropanolamine, and 2-amino-2-methyl-1-propanol. They may be used alone or in combination.

At the time of the production of the polyurethane-based resin, an organic solvent which is inert with respect to the polyisocyanate and which is compatible with water is preferably used. Examples of the organic solvent include ester-based solvents such as ethyl acetate, butyl acetate, and ethyl cellosolve acetate; ketone-based solvents such as acetone, methyl ethyl ketone, and methyl isobutyl ketone; and ether-based solvents such as dioxane, tetrahydrofuran, and propylene glycol monomethyl ether. They may be used alone or in combination.

The number average molecular weight of the polyurethane-based resin is preferably 5000 to 600,000 and more preferably 10,000 to 400,000. The acid value of the polyurethane-based resin is preferably 10 or more, more preferably 10 to 50, and particularly preferably 20 to 45. When the acid value is in such range, the adherence between the polarizer and the protective film may be more excellent.

The content of the inorganic fine particles is preferably 5 to 200 parts by weight, more preferably 5 to 100 parts by weight, and particularly preferably 5 to 50 parts by weight based on 100 parts by weight of the binder resin (solid content) in terms of a solid content. By setting the content of the inorganic fine particles in such a range, a UV-shielding layer sufficient in both UV-shielding ability and transparency can be obtained. Further, the adhesiveness to the optical member can be excellent. The method of forming a UV-shielding layer is described later in the item B.

The thickness of the UV-shielding layer is set at any suitable value. The thickness is preferably 0.5 to 10 μm, more preferably 2 to 10 μm. By setting the thickness in such a range, a UV-shielding layer sufficient in both UV-shielding ability and transparency can be obtained.

A-3. Protective Film

As the protective film, any suitable film is used. Preferably, a film having a moisture permeability of 200 g/m$^2$ or less is used. The moisture permeability is preferably 100 g/m$^2$ or less. By using such a film having low moisture permeability, an image display apparatus excellent in display quality, which suppresses the occurrence of display unevenness even under a high humidity condition, can be provided. Herein, the "moisture permeability" refers to a value obtained by measuring the amount (g) of water vapor passing through a sample with an area of 1 m$^2$ within 24 hours at a temperature of 40° C. in an atmosphere of a humidity of 92% RH, pursuant to a moisture permeability test (cup method) of JIS Z0208.

As the resin forming the protective film, preferably, (meth) acrylic resin and polyester-based resin such as polyethylene terephthalate (PET) are used. This is because those resins can satisfy the above-mentioned moisture permeability. Further, they can be excellent in adhesiveness to the UV-shielding layer. The "(meth)acrylic resin" refers to acrylic resin and/or methacrylic resin.

The glass transition temperature (Tg) of the (meth)acrylic resin is preferably 115° C. or more, more preferably 120° C. or more, still more preferably 125° C. or more, and particularly preferably 130° C. or more. By including a (meth) acrylic resin having a glass transition temperature (Tg) of 115° C. or more as a main component, the protective film is likely to have excellent durability. The upper limit value of Tg of the (meth)acrylic resin is not particularly limited. However, the value is preferably 170° C. or lower in view of forming property and the like.

As the (meth)acrylic resin, any suitable (meth)acrylic resin may be adopted. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth) acrylate-styrene copolymer (MS resin, etc.), and a polymer having an alicyclic hydrocarbon group (e.g., a methyl methacrylate-cyclohexyl methacrylate copolymer, a methyl methacrylate-norbornyl (meth)acrylate copolymer). A preferred example includes $C_{1-6}$ alkyl poly (meth)acrylic acid such as polymethyl (meth)acrylate. A more preferred example includes a methyl methacrylate-based resin containing methyl methacrylate as a main component (50 to 100% by weight, preferably 70 to 100% by weight).

Specific examples of the (meth)acrylic resin include ACRYPET VH and ACRYPET VRL20A manufactured by Mitsubishi Rayon Co. and a (meth)acrylic resin with high Tg obtained by intramolecular cross-linking or intramolecular cyclization reaction.

In the present invention, a (meth)acrylic resin having a glutaric anhydride structure, a (meth)acrylic resin having a lactone ring structure, and a (meth)acrylic resin having a glutarimide structure are each preferably used as the (meth) acrylic resin because the resins each have high heat resistance, high transparency, and high mechanical strength.

Examples of the (meth)acrylic resin having a glutaric anhydride structure include (meth)acrylic resins each having a glutaric anhydride structure described in, for example, JP 2006-283013 A, JP 2006-335902 A, and JP 2006-274118 A.

Examples of the (meth)acrylic resin having a lactone ring structure include (meth)acrylic resins each having a lactone ring structure described in, for example, JP 2000-230016 A, JP 2001-151814 A, JP 2002-120326 A, JP 2002-254544 A, and JP 2005-146084 A.

Examples of the (meth)acrylic resin having a glutarimide structure include (meth)acrylic resins each having a glutarimide structure as described in, for example, JP 2006-309033 A, JP 2006-317560 A, JP 2006-328329 A, JP 2006-328334 A, JP 2006-337491 A, JP 2006-337492 A, JP 2006-337493 A, JP 2006-337569 A, and JP 2007-009182 A.

The content of the (meth)acrylic resin and/or the polyester-based resin in the protective film is preferably 50 to 100% by weight, more preferably 50 to 99% by weight, still more preferably 60 to 98% by weight, and particularly preferably 70 to 97% by weight.

In addition to the (meth)acrylic resin and/or the polyester-based resin, the protective film may include other thermoplastic resins. Examples of the other thermoplastic resin include: olefin-based polymers such as polyethylene, polypropylene, an ethylene-propylene copolymer, and poly(4-methyl-1-pentene); halogenated vinyl-based polymers such as vinyl chloride, vinylidene chloride, and a chlorinated vinyl resin; acrylic polymers such as polymethyl methacrylate; styrene-based polymers such as polystyrene, a styrene-methyl methacrylate copolymer, a styrene-acrylonitrile copolymer, and an acrylonitrile-butadiene-styrene block copolymer; polyesters such as polyethylene terephthalate, polybutylene terephthalate, and polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamide imide; and rubber polymers such as an ABS resin and an ASA resin blended with polybutadiene-based rubber and acrylic rubber.

The content ratio of the other thermoplastic resin in the protective film is preferably 0 to 50% by weight, more preferably 0 to 40% by weight, still more preferably 0 to 30% by weight, and particularly preferably 0 to 20% by weight.

The protective film may contain an additive. Examples of the additive include hindered phenol-based, phosphorus-based, and sulfur-based antioxidants; stabilizers such as a light stabilizer, a weathering stabilizer, and a heat stabilizer; reinforcing materials such as glass fibers and carbon fibers; UV-absorbing agents such as phenyl salicylate, (2,2'-hydroxy-5-methylphenyl)benzotriazole, and 2-hydroxybenzophenone; a near infrared ray absorbing agent; flame retardants such as tris(dibromopropyl)phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; a flame retardant; and a retardation reducing agent.

The content ratio of the additive in the protective film is preferably 0 to 5% by weight, more preferably 0 to 2% by weight, and still more preferably 0 to 0.5% by weight.

Although a method of producing the protective film is not particularly limited, the film may be formed, for example, from a thermoplastic resin composition obtained in advance by thoroughly mixing the (meth)acrylic resin and/or the polyester-based resin, and another polymer, additive, or the like by any suitable mixing method. Alternatively, the film may be formed from a homogenous mixed solution obtained by mixing separate solutions of the (meth)acrylic resin and/or the polyester-based resin, and the another polymer, additive, or the like, respectively.

For producing the thermoplastic resin composition, for example, the film materials are preblended with any suitable mixer such as an omni mixer, and then, the obtained mixture is extruded and kneaded. In this case, the mixer to be used for extrusion and kneading is not particularly limited, and for example, any suitable mixer such as a single screw extruder, a twin screw extruder, a pressure kneader may be used.

Examples of the method of forming a film include any suitable film forming methods such as solution casting, melt extrusion, calendaring, and compression forming. Of those film forming methods, solution casting and melt extrusion are preferred.

Examples of a solvent to be used in the solution casting include aromatic hydrocarbons such as benzene, toluene, and xylene; aliphatic hydrocarbons such as cyclohexane and decalin; esters such as ethyl acetate and butyl acetate; ketons such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethylsulfoxide. These solvents may be used alone or in combination.

Examples of an apparatus for performing the solution casting include a drum-type casting machine, a band-type casting machine, and a spin coater.

Examples of the melt extrusion include a T-die method and an inflation method. The forming temperature is preferably 150 to 350° C. and more preferably 200 to 300° C.

In the case of forming a film by the T-die method, a T-die is attached to a tip end of a known single screw extruder or a twin screw extruder, and a film extruded in a film shape is taken up to obtain a roll-shaped film. At this time, by applying a stretching force in an extrusion direction while appropriately adjusting the temperature of the take-up roll, the film may be also stretched uniaxially. Further, by stretching a film in a direction perpendicular to the extrusion direction, simultaneous biaxial stretching, sequential biaxial stretching, or the like may also be performed.

The protective film may be any of an unstretched film and a stretched film. In the case where the protective film is a stretched film, the film may be any of a uniaxially stretched film and a biaxially stretched film. In the case where the stretched film is the biaxially stretched film, the biaxially stretched film may be any of a simultaneously biaxially stretched film and a sequentially biaxially stretched film. In the case where the film is stretched biaxially, the mechanical strength and film performance are enhanced. When another thermoplastic resin is incorporated into the protective film, a retardation may be prevented from increasing even if the film is stretched, and hence, optical isotropy may be held.

The stretching temperature is preferably in the vicinity of a glass transition temperature of a thermoplastic resin composition that is a film material, and the specific temperature is preferably (glass transition temperature−30° C.) to (glass transition temperature+100° C.) and more preferably (glass transition temperature−20° C.) to (glass transition temperature+80° C.). When the stretching temperature is lower than (glass transition temperature−30° C.), there is a possibility that a sufficient stretching ratio may not be obtained. On the contrary, when the stretching temperature exceeds (glass transition temperature+100° C.), flow of the resin composition occurs, which may prevent stable stretching.

The stretching ratio defined in an area ratio is preferably 1.1 to 25 times and more preferably 1.3 to 10 times. The stretching ratio of less than 1.1 times may not lead to the enhancement of toughness involved in stretching. When the stretching ratio exceeds 25 times, the effect to be obtained by enhancing the stretching ratio may not be recognized.

The stretching speed is preferably 10 to 20,000%/min. and more preferably 100 to 10,000%/min. in one direction. When the stretching speed is less than 10%/min., it takes time to obtain a sufficient stretching ratio and a production cost may be high. When the stretching speed exceeds 20,000%/min., a stretched film may, for example, be broken.

The protective film may be subjected to heat treatment (annealing) or the like after stretching treatment in order to stabilize its optical isotropy and mechanical characteristics. As the conditions of the heat treatment, any suitable conditions may be adopted.

The thickness of the protective film is preferably 5 to 200 μm, more preferably 10 to 100 μm and particularly preferably 10 to 50 μm. When the thickness is less than 5 μm, crimping may be increased when the durability test of the polarizing plate is conducted, in addition to the decrease in strength. When the thickness exceeds 200 μm, transparency may be degraded.

The wetting tension of the surface of the protective film is preferably 40 mN/m or more, more preferably 50 mN/m or more, and still more preferably 55 mN/m or more. When the wetting tension of the surface is 40 mN/m or more, the adhesion strength between the protective film and the polarizer is further enhanced. In order to adjust the wetting tension of the surface, any suitable surface treatment may be performed. Examples of the surface treatment include corona discharge treatment, plasma treatment, ozone spraying, UV-ray irradiation, flame treatment, and chemical treatment. Of those, corona discharge treatment and plasma treatment are preferably used.

A-4. Adhesive Layer

As an adhesive forming the adhesive layer, any suitable adhesive may be adopted. Preferably, the adhesive layer is formed of an adhesive composition containing a polyvinyl alcohol-based resin.

Examples of the polyvinyl alcohol-based resin include a polyvinyl alcohol resin and an acetoacetyl group-containing polyvinyl alcohol resin. The polyvinyl alcohol-based resin is preferably an acetoacetyl group-containing polyvinyl alcohol resin. This is because the resin is excellent in adhesiveness between the polarizer and the protective film, and may be excellent in durability.

Examples of the above-mentioned polyvinyl alcohol-based resin include: a saponified polyvinyl acetate and derivatives of the saponified product; a saponified product of a copolymer obtained by copolymerizing vinyl acetate with a monomer having copolymerizability; and a modified polyvinyl alcohol obtained by modifying polyvinyl alcohol to acetal, urethane, ether, graft, or phosphate. Examples of the monomer include unsaturated carboxylic acids such as maleic acid (anhydrides), fumaric acid, crotonic acid, itaconic acid, and (meth)acrylic acid and esters thereof; α-olefin such as ethylene and propylene; (sodium)(meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. Those resins may be used alone or in combination.

The polyvinyl alcohol-based resin has an average degree of polymerization of preferably about 100 to 5,000, and more preferably 1,000 to 4,000, from a viewpoint of adhesive property. The polyvinyl alcohol-based resin has an average degree of saponification of preferably about 85 to 100 mol %, and more preferably 90 to 100 mol %, from a viewpoint of adhesive property.

The above polyvinyl alcohol-based resin containing an acetoacetyl group is obtained, for example, by reacting a polyvinyl alcohol-based resin with diketene by any method. Specific examples thereof include a method of adding diketene to a dispersion in which a polyvinyl alcohol-based resin is dispersed in a solvent such as acetic acid, a method of adding diketene to a solution in which a polyvinyl alcohol-based resin is dissolved in a solvent such as dimethylformamide or dioxane, and a method of bringing diketene gas or liquid diketene into direct contact with a polyvinyl alcohol-based resin.

The acetoacetyl group modification degree of the above polyvinyl alcohol-based resin containing an acetoacetyl group is typically 0.1 mol % or more, preferably about 0.1 to 40 mol %, more preferably 1 to 20 mol %, and particularly preferably 2 to 7 mol %. When the modification degree is less than 0.1 mol %, water resistance may be insufficient. When the modification degree exceeds 40 mol %, the effect of the enhancement of water resistance is small. The acetoacetyl group modification degree is a value measured by NMR.

The adhesive composition may contain a cross-linking agent. As the cross-linking agent, any suitable cross-linking agent may be adopted. Preferably, a compound having at least two functional groups each having reactivity with a polyvinyl alcohol-based resin can be used as a cross-linking agent. Examples of the compound include: alkylene diamines having an alkylene group and two amino groups such as ethylene diamine, triethylene diamine, and hexamethylene diamine; isocyanates such as tolylene diisocyanate, hydrogenated tolylene diisocyanate, trimethylene propane tolylene diisocyanate adduct, triphenylmethane triisocyanate, methylene bis (4-phenylmethane)triisocyanate, isophorone diisocyanate, and ketoxime blocked compounds thereof or phenol blocked compounds thereof; epoxides such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylolurea, methylolmelamine, alkylated methylolurea, alkylated methylol melamine, acetoguanamine, or benzoguanamine; and salts of sodium, potassium divalent metals or trivalent metals such as magnesium, calcium, aluminum, iron, and nickel and oxides thereof. Of those, an amino-formaldehyde resin and dialdehydes are preferred. As the amino-formaldehyde resin, a compound having a methylol group is preferred, and as the dialdehydes, glyoxal is preferred. Of those, a compound having a methylol group is preferred, and methylol melamine is particularly preferred.

The blending amount of the above cross-linking agent may be appropriately set depending upon the kind of the above polyvinyl alcohol-based resin and the like. Typically, the blending amount of the above cross-linking agent is about 10 to 60 parts by weight, and preferably 20 to 50 parts by weight based on 100 parts by weight of the polyvinyl alcohol-based resin. This is because the cross-linking agent in such a blending amount is excellent in adhesive property. In the case where the blending amount of the cross-linking agent is large, the reaction of the cross-linking agent proceeds in a short period of time, and an adhesive tends to be gelled. Consequently, the usable time (pot life) of the adhesive becomes extremely short, which may make it difficult to use the adhesive industrially.

The adhesive composition may contain a metal compound colloid. The metal compound colloid may have a configuration in which metal compound fine particles are dispersed in a disperse medium, and may be electrostatistically stabilized due to the interaction between the same kind of charges of the fine particles and have stability perpetually. Owing to inclusion of such metal compound colloid, for example, there may be obtained an adhesive composition excellent in stability even in the case where the compounding amount of the cross-linking agent is large.

The average particle diameter of the fine particles forming a metal compound colloid may be any suitable value as long as the optical properties such as polarization properties are not adversely influenced. The average particle diameter is preferably 1 to 100 nm, and more preferably 1 to 50 nm. This is because the fine particles may be dispersed uniformly in an adhesive layer to keep adhesive property, and the occurrence of knick defects may be suppressed. The "knick defects" refer to light leakage.

As the above metal compound, any suitable compound may be adopted. Examples of the metal compound include a metal oxide such as alumina, silica, zirconia, or titania; a metal salt such as aluminum silicate, calcium carbonate, magnesium silicate, zinc carbonate, barium carbonate, or calcium phosphate; and a mineral such as cerite, talc, clay, or kaolin. As described later, according to the present invention, a metal compound colloid having a positive charge is used preferably. Examples of the metal compound include alumina and titania, and alumina is particularly preferred.

The metal compound colloid is typically present in a state of a colloid solution in which the metal compound colloid is dispersed in a dispersion medium. Examples of the dispersion medium include water and alcohols. The concentration of a solid content in a colloid solution is typically about 1 to 50% by weight, and preferably 1 to 30% by weight. The colloid solution may contain acids such as nitric acid, hydrochloric acid, and acetic acid as a stabilizer.

The blending amount of the above metal compound colloid (solid content) is preferably 200 parts by weight or less, more preferably 10 to 200 parts by weight, much more preferably 20 to 175 parts by weight, and most preferably 30 to 150 parts by weight based on 100 parts by weight of the polyvinyl alcohol-based resin. This is because such a blending amount may suppress the occurrence of knick defects while keeping adhesive property.

The adhesive composition of the embodiment of the present invention may contain: a coupling agent such as a silane coupling agent and a titanium coupling agent; various kinds of tackifiers; a UV absorber; an antioxidant; and stabilizers such as a heat-resistant stabilizer and a hydrolysis-resistant stabilizer.

The form of the adhesive composition is preferably an aqueous solution (resin solution). The resin concentration is preferably 0.1 to 15% by weight, and more preferably 0.5 to 10% by weight in terms of applicability, shelf stability, and the like. The viscosity of the resin solution is preferably 1 to 50 mPa·s. In the case where the metal compound colloid is included, the occurrence of knick defects may be effectively suppressed even in the range of a low viscosity of 1 to 20 mPa·s. The pH of the resin solution is preferably 2 to 6, more preferably 2.5 to 5, still more preferably 3 to 5, and most preferably 3.5 to 4.5. Usually, the surface charge of the metal compound colloid may be controlled by adjusting the pH. The surface charge is preferably a positive charge. The presence of a positive charge may further suppress the occurrence of knick defects. Note that, the surface charge may be checked, for example, by measuring the zeta potential with a zeta potential measurement device.

As a method of preparing the resin solution, any suitable method may be adopted. In the case where the resin solution contains the cross-linking agent and the metal compound colloid, for example, a method of mixing a polyvinyl alcohol-based resin with a cross-linking agent previously and adjusting the mixture to an appropriate concentration, and blending a metal compound colloid with the mixture thus obtained may be adopted. Alternatively, after mixing a polyvinyl alcohol-based resin with a metal compound colloid, a cross-linking agent may be mixed with the mixture while considering a use period and the like. The concentration of the resin solution may be adjusted after the resin solution is prepared.

The thickness of the adhesive layer formed of the adhesive composition may be set at any suitable value depending upon, for example, the composition of the adhesive composition. The thickness is preferably 10 to 300 nm, more preferably 10 to 200 nm, and particularly preferably 20 to 150 nm. This is because sufficient adhesive strength may be obtained.

A-5. Others

As the second protective film, any suitable film is used. Specific examples thereof include a cellulose-based polymer such as diacetyl cellulose and triacetyl cellulose, in addition to the materials described in the item A-3. An adhesive layer provided between the polarizer and the second protective film is formed with any suitable adhesive. For example, the adhesive composition described in the item A-4 is used.

B. Production Method

As the method of producing a polarizing plate of the present invention, any suitable method is adopted. Hereinafter, one embodiment is described. The UV-shielding layer is formed on one side of the protective film in advance. The UV-shielding layer is typically formed by applying a resin composition containing the inorganic fine particles and the binder resin to one side of a protective film, followed by drying. The resin composition is preferably a water-based composition. This is because the water-based composition may be environmentally friendly and excellent in workability, compared with a solvent-based composition.

The inorganic fine particles are preferably compounded in the resin composition in the form of a dispersion. The inorganic fine particles are likely to coagulate, and hence, it is preferred that the inorganic fine particles are sufficiently dispersed alone in advance. Thus, a UV-shielding layer exceptional in UV-shielding ability and transparency can be formed. Examples of a dispersion solvent include water, alcohols, ketones, and esters. Preferably, a suitable dispersion solvent is selected depending upon a solvent of the resin composition. Any suitable dispersant is used for preparing the dispersion. As the dispersant, for example, a polymer dispersant is used, and an example of a commercially available product includes the SOLSPERSE series produced by Lubrizol Japan Ltd. As the dispersion of the inorganic fine particles, the commercially available product can be used as it is. Examples of commercially available products of a zinc oxide dispersion include ZNW-G0 produced by C.I. Kasei Co., Ltd., ZW733T and ZW-143 produced by Sumitomo Osaka Cement Co., Ltd., and NANOBYK20 produced by BYK. Examples of commercially available products of a titanium oxide dispersion include SRD-01W and SRD-02W produced by Sakai Chemical Industry Co., Ltd.

The resin composition preferably contains a cross-linking agent. As the cross-linking agent, any suitable cross-linking agent is used. Specifically, in the case where the binder resin is polyurethane-based resin having a carboxyl group, a preferred example of the cross-linking agent includes a polymer having a group capable of reacting with a carboxyl group. Examples of the group capable of reacting with the carboxyl group include an organic amino group, an oxazoline group, an epoxy group, and a carbodimide group. Preferably, the cross-linking agent has an oxazoline group. Of those, the cross-linking agent having an oxazoline group has a long pot life at room temperature when mixed with the polyurethane-based resin and undergoes a cross-linking reaction by heating, and hence has satisfactory workability.

As the polymer, any suitable polymer may be used. Examples of the polymer include an acrylic polymer and a styrene acrylic polymer. The polymer is preferably an acrylic polymer. With the use of the acrylic polymer, the adhesiveness to an optical member may be further enhanced. Further, the acrylic polymer may be stably compatible with a water-based resin composition, and may be cross-linked with the polyurethane-based resin satisfactorily.

The resin composition can further contain any suitable additive. Examples of the additive include an antiblocking agent, a dispersion stabilizer, a thixotropic agent, an antioxidant, a UV-absorbing agent, an antifoaming agent, a thickener, a dispersant, a surfactant, a catalyst, a filler, a lubricant, and an antistatic agent.

As a method of applying the resin composition, any suitable method is adopted. Examples of the method include a bar coating method, a roll coating method, a gravure coating method, a rod coating method, a slot orifice coating method, a curtain coating method, and a fountain coating method.

As described above, the resin composition is preferably a water-based composition. The concentration of the binder resin in the resin composition is preferably 1.5 to 15% by weight and more preferably 2 to 10% by weight. This is because the composition may be excellent in workability during formation of the UV-shielding layer. The content of the cross-linking agent in the resin composition (solid content) is preferably 1 to 30 parts by weight and more preferably 3 to 20 parts by weight based on 100 parts by weight of the binder resin (solid content). By setting the content at 1 part by weight or more, the UV-shielding layer may be excellent in adhesiveness to an optical member. On the other hand, by setting the content at 30 parts by weight or less, a retardation may be prevented from being expressed in the UV-shielding layer.

The drying temperature is typically 50° C. or more, preferably 90° C. or more, and more preferably 110° C. or more. By setting the drying temperature in such range, a polarizing plate excellent in color fastness (in particular, under high-temperature and high-humidity conditions) may be provided. The drying temperature is preferably 200° C. or less and more preferably 180° C. or less.

As described above, at least one side (for example, the side on which the UV-shielding layer is formed) of the protective film may be subjected to a surface treatment. In this case, the surface treatment is performed before the UV-shielding layer is formed. The specific example of the surface treatment is as described in the above-mentioned item A-3. The surface treatment is preferably a corona discharge treatment or a plasma treatment. By subjecting the protective film to the corona discharge treatment, the adhesive property and adhesiveness between the polarizer and the protective film may be further enhanced. The corona discharge treatment is performed under any suitable conditions. A corona discharge electron irradiation amount, for example, is preferably 50 to 150 W/m$^2$/min, and more preferably 70 to 100 W/m$^2$/min.

The transmittance in a visible region (wavelength: 550 nm) of a laminate (single film) of a protective film and a UV-shielding layer is preferably 80% or more, more preferably 85% or more. The transmittance in a UV-region (wavelength: 350 nm) of the single film is preferably 5% or less, more preferably 3% or less.

Next, a protective film with a UV-shielding layer formed thereon and the above-mentioned polarizer are laminated via an adhesive layer. Preferably, the protective film is laminated so that the UV-shielding layer formed thereon is placed on the polarizer side.

A specific example includes applying the adhesive composition to any one side of the polarizer or the protective film, and thereafter, attaching the polarizer and the protective film to each other, followed by drying. Examples of the method of applying the adhesive composition include a roll method, a spray method, and a soaking method. In the case where the adhesive composition contains a metal compound colloid, the adhesive composition is applied so that the thickness thereof after being dried becomes larger than an average particle diameter of the metal compound colloid. The drying temperature is typically 5 to 150° C., preferably 30 to 120° C. The drying time is typically 120 seconds or longer, preferably 180 seconds or longer.

C. Image Display Apparatus

The image display apparatus of the present invention includes the polarizing plate of the present invention. Specific examples of the image display apparatus include self-emitting type display apparatuses such as an electroluminescence (EL) display, a plasma display (PD), and a field emission display (FED), and a liquid crystal display apparatus. The liquid crystal display apparatus includes a liquid crystal cell and the polarizing plate placed on at least one side of the liquid crystal cell.

EXAMPLES

Hereinafter, the present invention is specifically described by way of examples, but the present invention is not limited by the examples. It should be noted that the measurement methods of the thickness and the moisture permeability are as follows.

<Thickness>

The thickness was measured by observing a cross-section with FE-SEM (SEM EDX type NS-3000N (product name) produced by Hitachi Ltd.).

<Moisture Permeability>

The moisture permeability was measured at a temperature of 40° C. in an atmosphere of a humidity of 92% RH, pursuant to a moisture permeability test (cup method) of JIS Z0208.

Example 1

(Production of Polarizer)

A polyvinyl alcohol film with a thickness of 75 μm was soaked in hot water at 28° C. for 60 seconds to be swollen. Next, the polyvinyl alcohol film was soaked in an aqueous solution containing iodine and potassium iodide (weight ratio 1:10) and dyed so as to obtain a predetermined single axis transmittance while being stretched by 3.3 times. Then, the resultant polyvinyl alcohol film was soaked in an aqueous solution containing 3% by weight of boric acid and 2% by weight of potassium iodide for 10 seconds and stretched in an aqueous solution containing 4% by weight of boric acid and 3% by weight of potassium iodide at 60° C. so that the stretching ratio became 6.0 times in total. Then, the obtained stretched film was soaked in an aqueous solution containing 5% by weight of potassium iodide for 10 seconds and dried in an oven at 40° C. for 3 minutes to obtain a polarizer with a thickness of 30 μm.

(Production of Protective Film)

A pellet [a mixture (Tg 127° C.) of 90 parts by weight of (meth)acrylic resin having a lactone ring structure in which $R^1$ is a hydrogen atom and $R^2$ and $R^3$ are methyl groups in the following general formula (I) {copolymerization monomer weight ratio=methyl methacrylate/2-(hydroxymethyl)methyl acrylate=8/2, lactone ring formation rate: about 100%, content ratio of the lactone ring structure: 19.4%, weight average molecular weight: 133,000, melt flow rate: 6.5 g/10 min. (240° C., 10 kgf), Tg 131° C.} and 10 parts by weight of acrylonitryl-styrene (AS) resin {Toyo-AS AS 20 produced by Toyo Styrene Co., Ltd.} was supplied to a biaxial extruder and melt-extruded in a sheet shape at about 280° C. to obtain a (meth)acrylic resin sheet having a lactone ring structure with a thickness of 110 μm. The unstretched sheet was stretched longitudinally by 2.0 times and laterally by 2.4 times under a temperature condition of 160° C. to obtain a protective film (moisture permeability: 20 g/m², thickness: 40 μm).

[Chem 1]

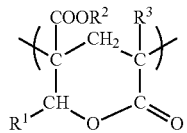

(1)

(Preparation of Binder Resin Solution)

Forty parts by weight of polyester urethane (Superflex 210 (trade name), solid content: 33%, produced by Dai-ichi Kogyo Seiyaku Co., Ltd.), 10 parts by weight of a cross-linking agent (oxazoline-containing polymer, EPOCROSS WS-700 (trade name), solid content: 25%, produced by Nippon Shokubai Co., Ltd.), and 185.7 parts by weight of pure water were mixed to obtain a binder resin solution with a solid content concentration adjusted to 7% by weight.

(Preparation of Resin Composition)

One hundred parts by weight of the obtained binder resin solution and 16.7 parts by weight of a zinc oxide dispersion (ZNW15WT %-G0 (trade name), solid content: 15% by weight, produced by C.I. Kasei Co., Ltd.) were mixed, and the mixture was subjected to a dispersion treatment for 10 minutes in an ultrasonic disperser (PANDA 2K (product name) produced by NIRO-SOAVI) to prepare a resin composition.

(Formation of UV-Shielding Layer)

The obtained resin composition was applied to a protective film with a wire bar No. 15 and dried by heating at 130° C. for 10 minutes to form a UV-shielding layer. The thickness of the obtained UV-shielding layer was 2.0 μm.

(Preparation of Adhesive Composition)

Twenty parts by weight of methylolmelamine were dissolved in pure water under a temperature condition of 30° C. with respect to 100 parts by weight of polyvinyl alcohol-based resin containing an acetoacetyl group (average polymerization degree: 1200, saponification degree: 98.5 mol %, acetoacetyl group modification degree: 5 mol %) to obtain an aqueous solution with a solid content concentration of 0.5%. The obtained aqueous solution was used as the adhesive composition under a temperature condition of 30° C.

(Production of Polarizing Plate)

Thirty minutes after the preparation of the adhesive composition, the adhesive composition was applied onto the UV-shielding layer formed on the protective film so that the thickness of the composition after being dried became 50 nm. A polarizer was attached to the UV-shielding layer via the adhesive composition and dried by heating at 70° C. for 3 minutes to produce a polarizing plate.

Example 2

A polarizing plate was produced in the same way as in Example 1 except that the resin composition was applied with a wire bar No. 20 for forming the UV-shielding layer. The thickness of the obtained UV-shielding layer was 3.0 μm.

Example 3

A polarizing plate was produced in the same way as in Example 1 except that the resin composition was applied with a wire bar No. 30 for forming the UV-shielding layer. The thickness of the obtained UV-shielding layer was 5.0 μm.

Example 4

A polarizing plate was produced in the same way as in Example 1 except that the resin composition was applied with a wire bar No. 40 for forming the UV-shielding layer. The thickness of the obtained UV-shielding layer was 10 μm.

Example 5

A polarizing plate was produced in the same way as in Example 2, except for using a PET film (Diafoil T190E38 (tradename), moisture permeability: 20 g/m$^2$, thickness: 38 μm, produced by Mitsubishi Chemical Corporation) as the protective film.

Example 6

A polarizing plate was produced in the same way as in Example 2, except for using the following resin composition for forming a UV-shielding layer. The thickness of the obtained UV-shielding layer was 3.0 μm.
(Preparation of Resin Composition)

Twenty-five parts by weight of titanium oxide (Titanium oxide STR100A (trade name) produced by Sakai Chemical Industry Co., Ltd.), 2.5 parts by weight of a dispersant (SOL-SPERSE 46000 (trade name) produced by Lubrizol Japan Ltd.), and 75 parts by weight of pure water were mixed, and the mixture was subjected to a dispersion treatment with a nanomizer (Yoshida Kikai Co., Ltd.) at 100 MPa once to obtain a titanium oxide dispersion with a solid content concentration of 25% by weight.

Ten parts by weight of the obtained titanium oxide dispersion and 100 parts by weight of the binder resin solution were mixed, and the mixture was subjected to a dispersion treatment with an ultrasonic disperser for 10 minutes to prepare a resin composition.

Example 7

A polarizing plate was produced in the same way as in Example 6, except for using a PET film as the protective film.

Comparative Example 1

A polarizing plate was produced in the same way as in Example 3, except for using the following resin composition for forming a UV-shielding layer. The thickness of the obtained UV-shielding layer was 3.5 μm.
(Preparation of Resin Composition)

One hundred parts by weight of the binder resin solution and 25 parts by weight of an alumina dispersion (Aluminazol 10A (trade name), solid content: 10% by weight, produced by Kawaken Fine Chemicals Co., Ltd.) were mixed, and the mixture was subjected to a dispersion treatment with an ultrasonic disperser for 10 minutes to prepare a resin composition.

Comparative Example 2

A polarizing plate was produced in the same way as in Example 3, except for using the following resin composition for forming a UV-shielding layer. The thickness of the obtained UV-shielding layer was 3.5 μm.
(Preparation of Resin Composition)

One hundred parts by weight of the binder resin solution and 10 parts by weight of colloidal silica (SNOWTEX OXS (trade name), solid content: 10% by weight, produced by Nissan Chemical Industries Ltd.) were mixed, and the mixture was subjected to a dispersion treatment with an ultrasonic disperser for 10 minutes to prepare a resin composition.

Each example and comparative example were evaluated as follows. Table 1 summarizes the evaluation results.
1. Transmittance A single film (laminate of a protective film and a UV-shielding layer) and a polarizing plate were measured for a transmittance in a UV-region (350 nm) and a visible region (wavelength: 550 nm). As a measurement apparatus, "U4100" produced by Hitachi Ltd. was used.

The transmittance of the polarizing plate was measured under a condition of attaching the obtained polarizing plate to a glass plate via a pressure-sensitive adhesive layer to obtain a laminate, and stacking the two laminates so that the absorption axes of the polarizers were perpendicular to each other.
2. Durability The obtained polarizing plate was placed in a UV long life feedmeter (Type: U48HB produced by Suga Test Instruments Co., Ltd.), and irradiated with UV-light from the protective film side for 250 hours. The durability of the polarizing plate was evaluated by measuring a change ratio of the transmittance of the polarizing plate in a visible region before and after the irradiation of UV-light. The change ratio (%) was calculated by the following equation.

Change ratio=(Transmittance after irradiation of UV-light−Transmittance before irradiation of UV-light)/Transmittance before irradiation of UV-light×100

TABLE 1

| | Protective film | Inorganic fine particle | Average primary particle diameter (nm) | Film thickness (μm) | Transmittance (%) | | | | Durability change ratio (%) |
| | | | | | Single film | | Polarizing plate | | |
| | | | | | UV region | Visible region | UV region | Visible region | |
|---|---|---|---|---|---|---|---|---|---|
| Example 1 | Acrylic | ZnO | 50 | 2.0 | 5 | 90 | 0.6 | 43 | 2.0 |
| Example 2 | Acrylic | ZnO | 50 | 3.0 | 1 | 90 | 0.4 | 43 | 1.1 |
| Example 3 | Acrylic | ZnO | 50 | 5.0 | 1 | 87 | 0.4 | 40 | 1.0 |
| Example 4 | Acrylic | ZnO | 50 | 10 | 1 | 83 | 0.4 | 38 | 1.0 |
| Example 5 | PET | ZnO | 50 | 3.0 | 1 | 85 | 0.4 | 39 | 1.2 |
| Example 6 | Acrylic | TiO$_2$ | 50 | 3.0 | 5 | 82 | 0.6 | 38 | 2.3 |
| Example 7 | PET | TiO$_2$ | 50 | 3.0 | 5 | 82 | 0.6 | 38 | 2.2 |
| Comparative Example 1 | Acrylic | Al$_2$O$_3$ | 10 | 3.5 | 89 | 91 | 33 | 43 | 6.5 |
| Comparative Example 2 | Acrylic | SiO$_2$ | 10 | 3.5 | 89 | 91 | 35 | 41 | 6.5 |

As shown in Table 1, Examples 1 to 7 have a very low transmittance in a UV-region and have excellent UV-shielding ability. Further, Examples 1 to 7 have a high transmittance in a visible region and are excellent in transparency. Examples 1 to 7 show a small change ratio of 5% or less and are excellent in durability. On the other hand, Comparative Examples 1 and 2 have a high transmittance in a UV-region and have no UV-shielding ability.

Reference Example 1

Ninety-five parts by weight of acrylic resin, 5 parts by weight of zinc oxide (FINEX-50 (trade name) produced by Sakai Chemical Industry Co., Ltd.), and 0.5 parts by weight of a dispersant (SOLSPERSE 46000 (trade name) produced by Lubrizol Japan Ltd.) were kneaded in Laboplastomill (No. 655 produced by Toyo Precision Parts Mfg. Co., Ltd.) under conditions of 260° C. and 20 rpm for 10 minutes. A number of aggregates were generated as a result, and a transparent film therefore was not produced.

Industrial Applicability

The polarizing plate of the present invention may be suitably used for an image display apparatus such as a liquid crystal display apparatus or a self-emitting type display apparatus.

What is claimed is:

1. A polarizing plate comprising:
   a polarizer;
   a UV-shielding layer containing an inorganic fine particle with a bandgap of 3.0 eV or more and a binder resin;
   a protective film;
   wherein the inorganic fine particle has an average primary particle diameter of 1 to 400 nm; and a content of the inorganic fine particle is 5 to 200 parts by weight based on 100 parts by weight of the binder resin in terms of a solid content.

2. A polarizing plate according to claim 1, wherein the inorganic fine particle is at least one kind of an inorganic fine particle selected from the group consisting of zinc oxide, zinc sulfide, cerium oxide, titanium oxide, and gallium nitride.

3. A polarizing plate according to claim 1, wherein excitation of an electron of the inorganic fine particle is direct transition.

4. A polarizing plate according to claim 1, wherein the protective film has a moisture permeability of 200 $g/m^2$ or less.

5. A polarizing plate according to claim 1, wherein a resin forming the protective film is formed of (meth) acrylic resin.

6. A polarizing plate according to claim 1, wherein a difference Δn between a refractive index of the inorganic fine particle and a refractive index of the binder resin is 1.0 or less.

7. A polarizing plate according to claim 1, wherein the binder resin is polyurethane-based resin.

8. A polarizing plate according to claim 1, wherein the UV-shielding layer has a thickness of 0.5 to 10 μm.

9. A polarizing plate according to claim 1, wherein a laminate of the protective film and the UV-shielding layer has a transmittance of 80% or more at a wavelength of 550 nm, and a transmittance of 5% or less at a wavelength of 350 nm.

10. An image display apparatus comprising the polarizing plate according to claim 1.

* * * * *